United States Patent
Edwards et al.

(10) Patent No.: US 11,004,080 B2
(45) Date of Patent: May 11, 2021

(54) FRAUD DETERRENCE AND/OR IDENTIFICATION USING MULTI-FACETED AUTHORIZATION PROCEDURES

(71) Applicant: Capital One Services, LLC, McLean, VA (US)

(72) Inventors: Joshua Edwards, Philadelphia, PA (US); Michael Mossoba, Arlington, VA (US); Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/933,024

(22) Filed: Mar. 22, 2018

(65) Prior Publication Data

US 2019/0295084 A1  Sep. 26, 2019

(51) Int. Cl.
*G06Q 20/40* (2012.01)
*H04W 12/12* (2021.01)
*G06Q 20/32* (2012.01)
*G06Q 20/36* (2012.01)
*G06Q 20/34* (2012.01)

(52) U.S. Cl.
CPC ......... *G06Q 20/4016* (2013.01); *G06Q 20/32* (2013.01); *G06Q 20/34* (2013.01); *G06Q 20/354* (2013.01); *G06Q 20/3674* (2013.01); *G06Q 20/40* (2013.01); *G06Q 20/40145* (2013.01); *H04W 12/12* (2013.01)

(58) Field of Classification Search
CPC ............. G06Q 20/409; G06Q 20/4093; G06Q 20/4097; G06Q 20/4016

USPC .......................................................... 705/44
See application file for complete search history.

(56) References Cited

U.S. PATENT DOCUMENTS

| | | | |
|---|---|---|---|
| 5,793,027 A * | 8/1998 | Baik ................ | G06K 19/07703 235/380 |
| 7,509,285 B1 * | 3/2009 | Maniar .............. | G06Q 20/3674 705/35 |

(Continued)

OTHER PUBLICATIONS

Abbadi Laith, Multi-Factor Authentication Techniques for Video Applications over the Untrusted Internet, University of Ottawa, 2012 (Year: 2012).*

(Continued)

*Primary Examiner* — Elizabeth H Rosen
*Assistant Examiner* — Kevin T Poe
(74) *Attorney, Agent, or Firm* — Harrity & Harrity, LLP

(57) ABSTRACT

A device may receive, from a user device, a multimedia file that is to be used to authenticate a transaction card. The multimedia file may include data identifying a face of a user, data identifying a transaction card identifier, and data identifying an authorized action. The device may determine whether to authenticate the transaction card by executing one or more authentication procedures. The device may execute a first authentication procedure to verify that the multimedia file includes the data identifying the face of the user, the data identifying the transaction card identifier, and the data identifying the authorized action. The device may determine whether to activate the transaction card based on whether the transaction card has been authenticated. The device may provide a notification to the user device indicating whether the transaction card has been activated based on whether the transaction card has been activated.

20 Claims, 8 Drawing Sheets

(56) References Cited

U.S. PATENT DOCUMENTS

| | | | |
|---|---|---|---|
| 9,607,138 B1* | 3/2017 | Baldwin | G06F 21/32 |
| 10,509,951 B1* | 12/2019 | Nagalla | G06K 9/00315 |
| 2009/0152343 A1* | 6/2009 | Carter | G06Q 20/425 |
| | | | 235/379 |
| 2010/0332349 A1* | 12/2010 | Bonin | G06Q 20/0655 |
| | | | 705/27.1 |
| 2012/0159148 A1* | 6/2012 | Behren | G06Q 20/3552 |
| | | | 713/150 |
| 2012/0233072 A1* | 9/2012 | Calman | G06Q 40/02 |
| | | | 705/44 |
| 2012/0311068 A1* | 12/2012 | Gladwin | H04L 65/602 |
| | | | 709/214 |
| 2013/0063581 A1* | 3/2013 | Komatsu | G06K 9/00288 |
| | | | 348/77 |
| 2013/0132282 A1* | 5/2013 | Shakkarwar | G06Q 20/382 |
| | | | 705/64 |
| 2014/0123275 A1* | 5/2014 | Azar | G06K 9/6255 |
| | | | 726/19 |
| 2014/0165187 A1* | 6/2014 | Daesung | H04L 63/0861 |
| | | | 726/19 |
| 2014/0185931 A1* | 7/2014 | Aoki | H04N 1/62 |
| | | | 382/167 |
| 2015/0103136 A1 | 4/2015 | Anderson et al. | |
| 2016/0063235 A1 | 3/2016 | Tussy | |
| 2016/0066008 A1* | 3/2016 | Gobara | H04N 21/26283 |
| | | | 725/54 |
| 2016/0071101 A1* | 3/2016 | Winarski | G06Q 20/3829 |
| | | | 705/71 |
| 2016/0071111 A1 | 3/2016 | Wang et al. | |
| 2017/0154328 A1 | 6/2017 | Zarakas et al. | |
| 2017/0243225 A1* | 8/2017 | Kohli | G07C 9/37 |
| 2017/0323299 A1* | 11/2017 | Davis | G06Q 20/40145 |
| 2017/0344985 A1* | 11/2017 | Weisser | G06Q 20/20 |
| 2017/0372304 A1 | 12/2017 | Mattes et al. | |
| 2017/0372326 A1* | 12/2017 | Guzik | G06Q 50/26 |
| 2018/0089327 A1* | 3/2018 | Flack | H04L 67/2804 |
| 2018/0336327 A1* | 11/2018 | Wallace | G06F 21/32 |
| 2019/0020651 A1 | 1/2019 | Soon-Shiong et al. | |

OTHER PUBLICATIONS

DiFiglia Samuel, The Implementation of Biometrics in Credit Card transactions to improve the identification and authentication process, ProWuest LLC (Year: 2015).*

Raina Vibha Kaw, Integration of Biometric authentication procedure in customer oriented payment system in trusted mobile device, International Journal of Information Technology Convergence and Services vol. 1, No. 6, Dec. 2011 (Year: 2011).*

Ken Sweet, "Applying for a Credit Card? Please Take a Selfie" https://www.usnews.com/news/business/articles/2017-10-19/coming-soon-a-selfie-with-your-credit-card-application, Oct. 2017, 7 pages.

Apex Technology Management, Inc., "MasterCard's new selfie verification", https://www.apex.com/mastercards-new-selfie-verification/, Jul. 2015, 5 pages.

David Bisson, "What's worse than getting phished? Getting phished *and* sending a selfie of your Photo ID and credit card", https://www.grahamcluley.com/paypal-phished-selfie/, Jun. 2016, 13 pages.

Extended European Search Report for Application No. EP19162747.0, dated Jun. 21, 2019, 8 pages.

* cited by examiner

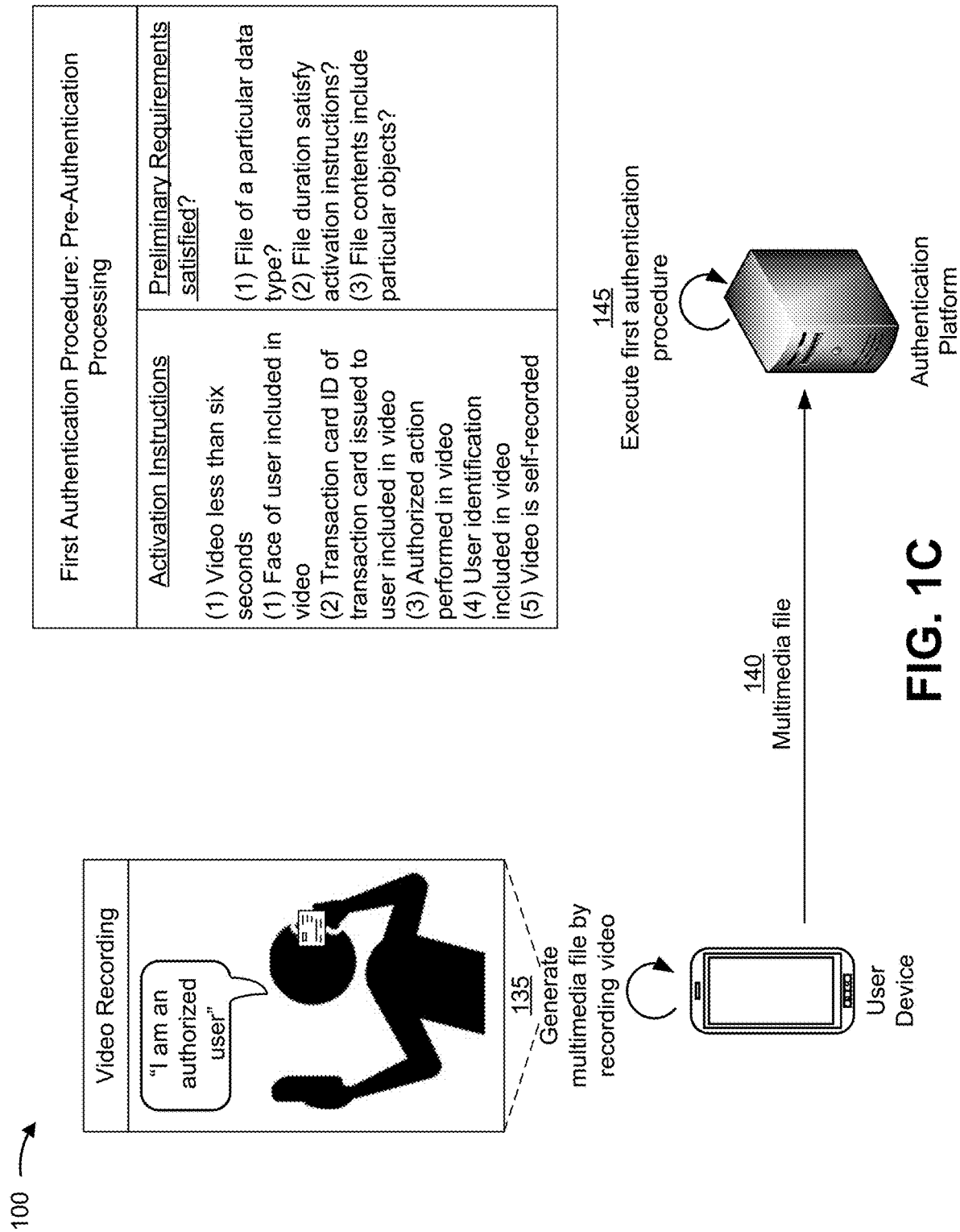

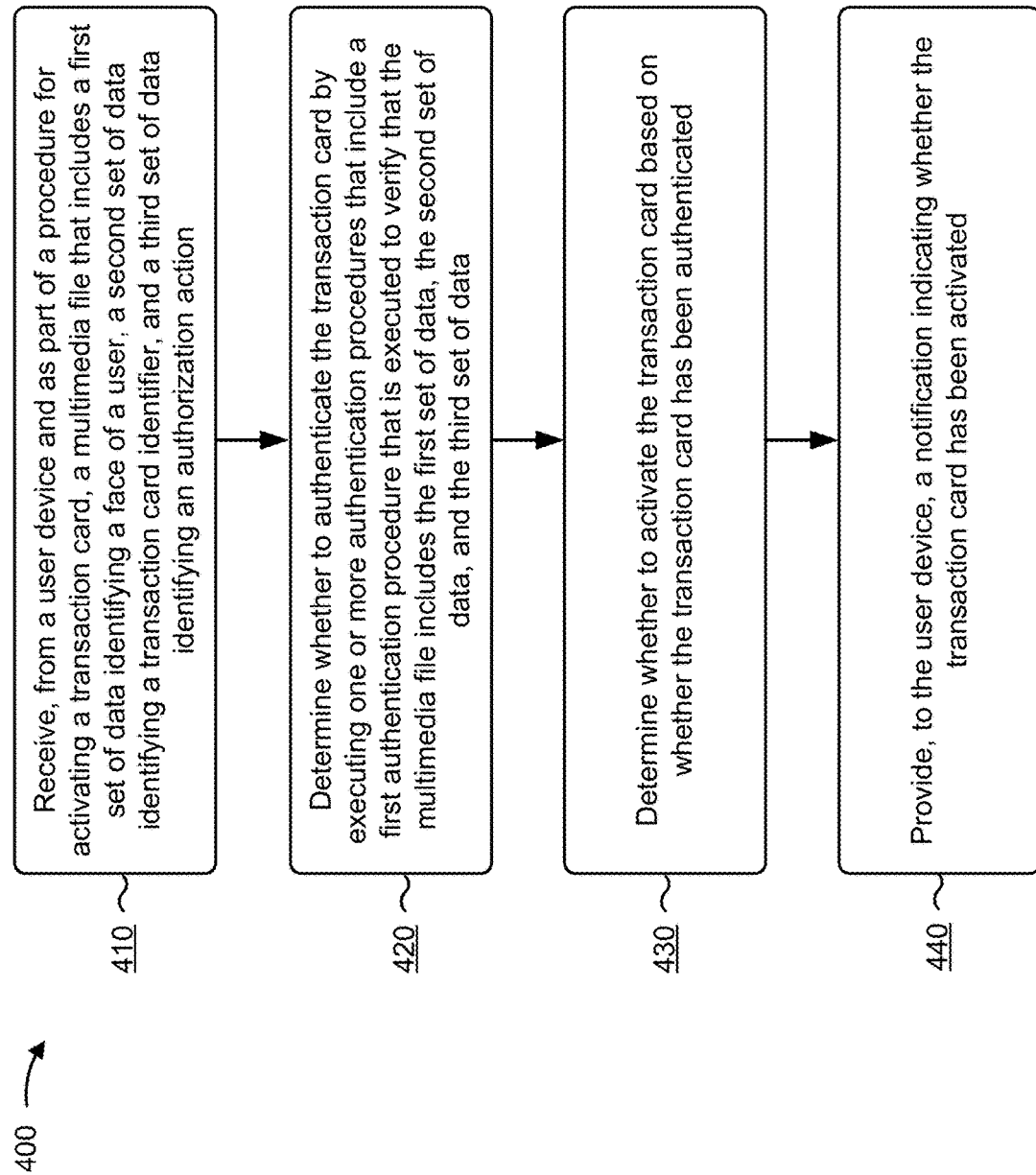

FRAUD DETERRENCE AND/OR IDENTIFICATION USING MULTI-FACETED AUTHORIZATION PROCEDURES

BACKGROUND

When an individual is approved for a transaction card (e.g., a credit card, a debit card, and/or the like), the transaction card may be sent to a home of the individual. From the time the transaction card is sent to the home of the individual, to the time the individual activates the transaction card, the transaction card may be at risk of being intercepted by an unauthorized user.

SUMMARY

According to some possible implementations, a method may include receiving, by a device and from a user device, a multimedia file that is to be used to authenticate a transaction card. The multimedia file may be received as part of a procedure for activating the transaction card. The multimedia file may include a first set of data identifying a face of a user, a second set of data identifying a transaction card identifier, and a third set of data identifying an authorized action. The method may include determining, by the device, whether to authenticate the transaction card by executing one or more authentication procedures that process the multimedia file. The one or more authentication procedures may include a first authentication procedure that is executed to verify that the multimedia file includes the first set of data, the second set of data, and the third set of data. The method may include determining, by the device, whether to activate the transaction card based on whether the transaction card has been authenticated. The method may include providing, by the device and to the user device, a notification indicating whether the transaction card has been activated based on whether the transaction card has been activated.

According to some possible implementations, a device may include one or more memories and one or more processors that are communicatively coupled to the one or more memories. The one or more processors may be configured to receive, from a user device, a multimedia file that is to be used to authenticate a transaction card. The multimedia file may be received as part of a procedure for activating the transaction card. The multimedia file may include a first set of data identifying a face of a user, a second set of data identifying a transaction card identifier, and a third set of data identifying an authorized action. The first set of data may be a different data type than the first set of data and the second set of data. The one or more processors may be configured to determine whether to authenticate the transaction card by executing one or more authentication procedures that process the multimedia file. The one or more authentication procedures may include a first authentication procedure that is executed to verify that the multimedia file includes the first set of data, the second set of data, and the third set of data. The one or more processors may be configured to provide, to a server device, a request to activate the transaction card if the transaction card has been authenticated. The request may cause the server device to activate the transaction card, and to provide, to the device, an indication that the transaction card has been activated. The one or more processors may be configured to provide, to the user device, a notification indicating whether the transaction card has been activated based on receiving the indication that the transaction card has been activated.

According to some possible implementations, a non-transitory computer-readable medium may store one or more instructions that, when executed by one or more processors, cause the one or more processors to receive, from a user device, a multimedia file that is to be used to authenticate a transaction card. The multimedia file may be received as part of a procedure for activating the transaction card. The multimedia file may include a first set of data identifying a face of a user, a second set of data identifying a transaction card identifier, and a third set of data identifying an authorized action. The one or more instructions may cause the one or more processors to determine whether to authenticate the transaction card by executing a plurality of authentication procedures that process the multimedia file. The plurality of authentication procedures may include a first authentication procedure that is executed to verify that the multimedia file includes the first set of data, the second set of data, and the third set of data. The plurality of authentication procedures may include one or more additional authentication procedures that are executed to determine whether an unauthorized user is attempting to activate the transaction card. The one or more instructions may cause the one or more processors to determine whether to activate the transaction card based on whether the transaction card has been authenticated. The one or more instructions may cause the one or more processors to provide, to the user device, a notification indicating whether the transaction card has been activated based on whether the transaction card has been activated.

BRIEF DESCRIPTION OF THE DRAWINGS

FIGS. 1A-1E are diagrams of an example implementation described herein;

FIG. 4 is a flow chart of an example process for activating a transaction card by executing one or more authentication procedures that include an authentication procedure to verify that a multimedia file received from a user device includes data identifying a face of a user, data identifying a transaction card identifier, and data identifying an authorized action.

DETAILED DESCRIPTION

Figure 1A:
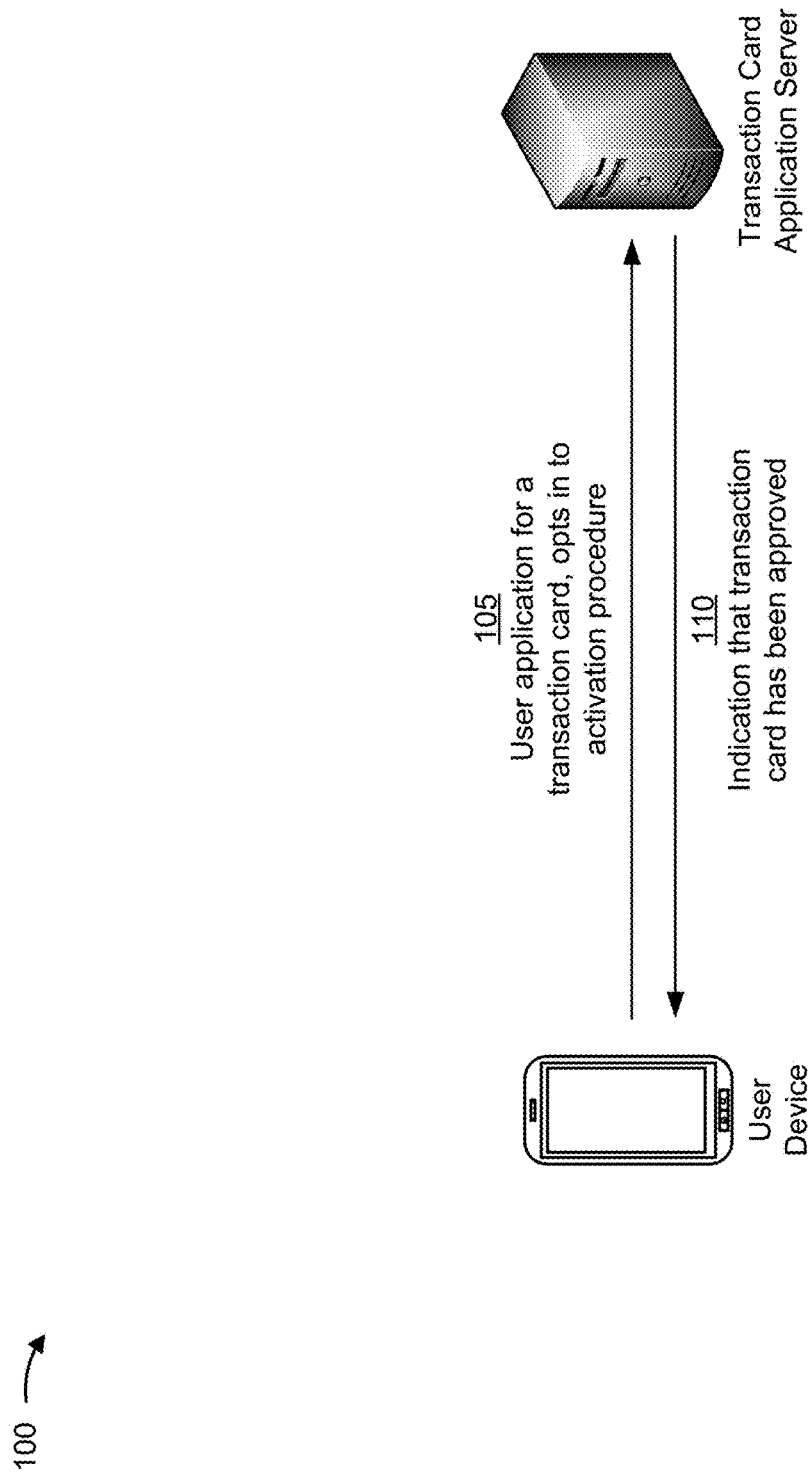

The following detailed description of example implementations refers to the accompanying drawings. The same reference numbers in different drawings may identify the same or similar elements.

Mail theft may occur when an unauthorized user intercepts and steals mail that is addressed to another individual. In some cases, the unauthorized user may intercept a transaction card that has yet to be activated by the other individual. For example, if the individual is approved for the transaction card, the transaction card may be sent by mail to a home of the individual. In this case, the unauthorized user may intercept the package or envelope that contains the transaction card. Additionally, the unauthorized user may be able to activate the transaction card using personal information of the individual that may also be included in the intercepted package or envelope or in another intercepted package or envelope taken intended for the individual.

One solution is to require the individual to activate the transaction card by taking a photograph of the individual (often referred to as a selfie) holding the transaction card next to the individual's face. The photograph may deter the unauthorized user from attempting to activate the card and/or may be used to catch the unauthorized user because the unauthorized user would have to submit a photograph that displays the face of the unauthorized user to an organization issuing the transaction card.

However, taking a photograph of the individual holding the transaction card next to the individual's face may not effectively deter and/or catch the unauthorized user. For example, the unauthorized user could pay a stranger to take the photograph, which would allow the unauthorized user to activate the transaction card without submitting a photograph of the unauthorized user's face. Additionally, or alternatively, the unauthorized use could use a software application to create or re-create the face of the individual that is issued the transaction card. Additionally, or alternatively, the unauthorized user could use a phishing scam (e.g., via electronic mail) to trick the individual that is issued the transaction card into sending a photograph of the individual holding the transaction card to the unauthorized user.

In some cases, an application, such as an application on a user device of the individual that is issued the transaction card, may be used to take the photograph. For example, the individual that is issued the transaction card may be required to use the application to take the photograph as an additional measure of security. However, the unauthorized user may be able to obtain login credentials for the individual using software that is able to successfully guess the login credentials, from another unauthorized user that is selling personal information of the individual, and/or the like. Additionally, or alternatively, the unauthorized user may be able to successfully steal the user device of the individual, in which case the unauthorized user may be able to use the user device to access the application.

Some implementations described herein provide an authentication platform to determine whether to activate a transaction card by executing a first authentication procedure to verify that a multimedia file received from a user device includes data identifying a face of a user, data identifying a transaction card identifier, and data identifying an authorized action. For example, a user may, as part of a procedure for activating the transaction card, interact with a user device to open an application that includes activation instructions indicating how to activate the transaction card. In this case, the activation instructions may require the user device to record a video that displays the face of the user, that displays the transaction card identifier (e.g., a sixteen digit identifier engraved on the transaction card), and that includes the user performing the authorized action. The authorized action may require the user to speak a word or phrase during the video, to make a particular movement or motion (e.g., a hand motion) during the video, and/or the like. Additionally, the user device may record the video, and may provide a multimedia file of the video to the authentication platform.

Additionally, the authentication platform may execute the first authentication procedure to verify that the multimedia file includes the first set of data identifying the face of the user, the second set of data identifying the transaction card identifier, and the third set of data identifying the authorized action, as described in detail further herein. In this case, if the first authentication procedure succeeds, the authentication platform may activate the transaction card, and may provide, to the user device, a notification that the transaction card has been activated. Additionally, or alternatively, the authentication platform may determine whether to activate the transaction card by executing one or more additional authentication procedures, as each described further herein.

Furthermore, the authentication platform may store the multimedia file in association with the transaction card identifier, such that the multimedia file may be used as evidence of fraudulent activity. For example, if an unauthorized user attempts to successfully activate the transaction card, the authentication platform may provide the multimedia file that includes the first set of data identifying the face of the user that activated the transaction card to a device associated with a law enforcement agency. This may allow the law enforcement agency to use the multimedia file to identify fraudulent activity and make an arrest.

In this way, the authentication platform is able to deter fraudulent uses of the transaction card and/or is able to catch an unauthorized user that fraudulently uses the transaction card. By deterring fraudulent uses of the transaction card, the authentication platform conserves processing resources that might otherwise be used to generate reports of incidents of fraud, conserves processing resources that might be used to generate alerts of incidents of fraud, conserves processing resources that might be used to generate reimbursements and/or notifications of reimbursement for customer devices after incidents of fraud, and/or the like.

Additionally, the authentication platform conserves network resources that might otherwise be used to provide reports of incidents of fraud to one or more devices, conserves network resources that might be used to provide alerts of incidents of fraud to one or more devices, conserves network resources that might be used to provide reimbursements and/or notifications of reimbursement to one or more devices, and/or the like. Furthermore, the authentication platform conserves memory resources that might be used to store reports of incidents of fraud, conserves memory resources that might be used to store alerts of incidents of fraud, conserves memory resources that might be used to store reimbursement information and/or notifications of reimbursements associated with fraud, and/or the like.

Additionally, the authentication platform efficiently and effectively utilizes processing resources and/or network resources. For example, the authentication platform, while capable of executing the one or more authentication procedures that each includes multiple authentication steps, is able to selectively identify and perform particular authentication procedures or particular steps within authentication procedures, thereby efficiently and effectively utilizing processing resources and/or network resources relative to an inferior platform that is unable to intelligently identify optimal authentication procedures or steps of authentication procedures to perform.

FIGS. 1A-1E are diagrams of an overview of an example implementation 100 described herein. For example, example implementation 100 may include an authentication platform that performs an activation procedure to determine whether to activate a transaction card.

As shown in FIG. 1A, and by reference number 105, a user device may provide, to a transaction card application server, an application for the transaction card. The transaction card may be a credit card, a debit card, an electronic funds transfer card, a point-of-sale card, an electronic funds gift card, a card associated with financial assets, a virtual card implemented on the user device or a different device, and/or the like. In some cases, the application may include an option that allows the user device to opt-in to the activation procedure. The activation procedure may provide additional security for ensuring that only a permitted user is able to activate the transaction card, as described further herein.

As shown by reference number 110, the user device may receive, from the transaction card application server, an indication that the transaction card has been approved. Additionally, the transaction card may be shipped to an address of a user that has received the approval.

In this way, the user device is able to opt-in to the activation procedure while completing the application for the transaction card.

Figure 1B:
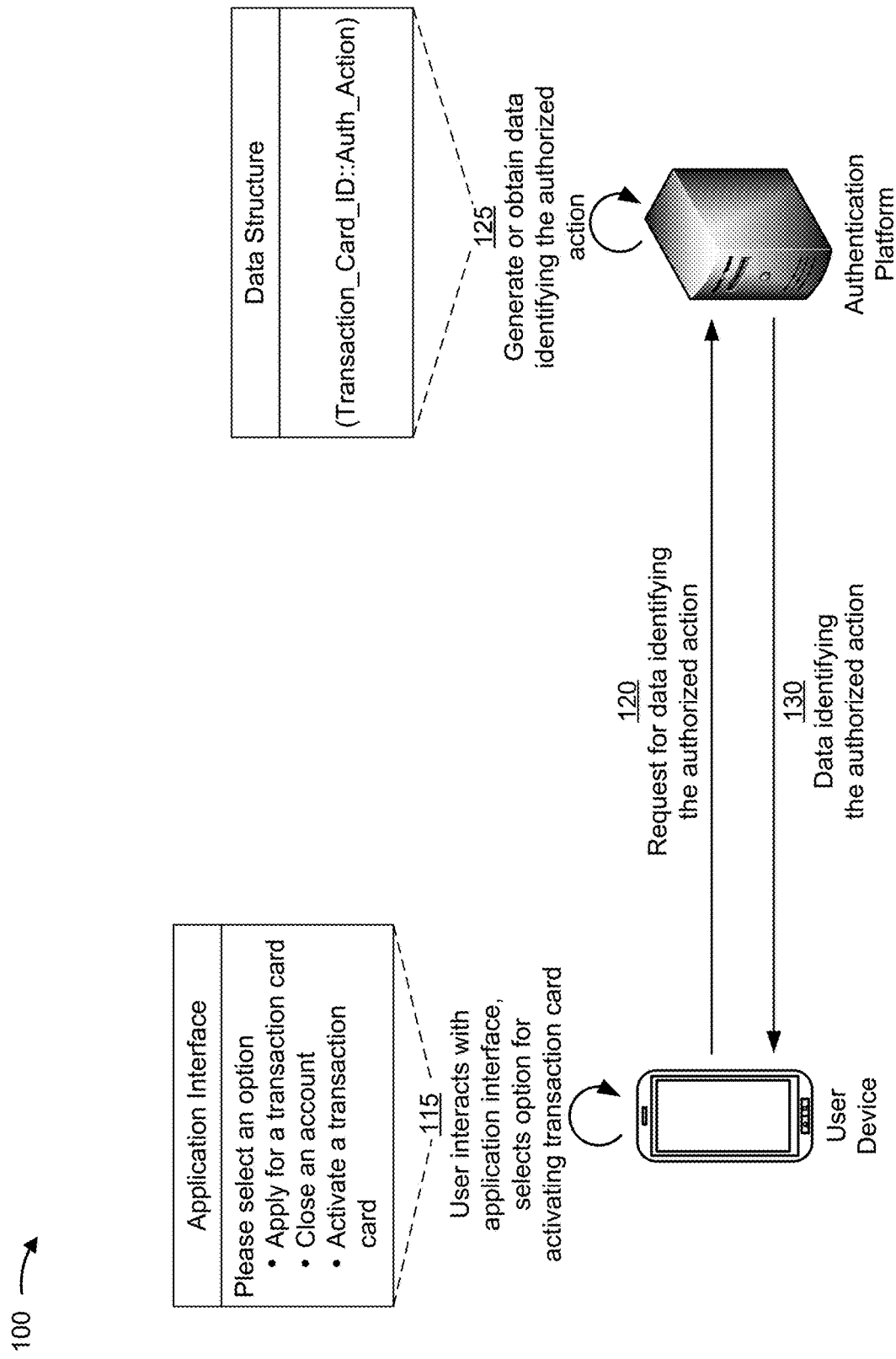

As shown in FIG. 1B, and by reference number 115, the user may interact with an application interface to select an option for activating the transaction card. For example, the user may open an application hosted by the user device, and may interact with an interface of the application to select the option for activating the transaction card.

In some implementations, the user selecting the option for activating the transaction card may cause the interface to display activation instructions indicating how to activate the transaction card. For example, the user interface may display activation instructions indicating that the user is to use a recording feature of the application to create a video that the authentication platform may process as part of the process for activating the transaction card.

Additionally, the activation instructions may indicate that the video is to display a face of the user that is requesting the activation of the transaction card, that the video is to display a transaction card identifier (e.g., a sixteen digit identifier engraved on the transaction card), that the video is to show the user performing an authorized action, that the user is displaying a form of user identification, that the video is taken by the user (e.g., and not a third party), and/or some combination thereof. The authorized action may require the user to speak a word or phrase during the video, to make a particular movement or motion (e.g., a hand motion) during the video, and/or the like. Data identifying the authorized action may be provided to the user device prior to creation of the video, using a distribution method described below.

As shown by reference number 120, the user device may provide, to the authentication platform, a request for data identifying the authorized action. For example, when the user selects the menu option for activating the transaction card, a request for the data identifying the authorized action may be automatically provided to the authentication platform.

As shown by reference number 125, the authentication platform may, upon receiving the request, generate or obtain the data identifying the authorized action. For example, the authentication platform may generate the data identifying the authorized action by generating a random sequence of characters (e.g., a number, a word, a phrase, etc.) to request the user to speak during the video, by generating instructions identifying a particular movement or motion that the user may perform during the video, and/or the like.

In some implementations, the authentication platform may generate the data identifying the authorized action in real-time (e.g., relative to receiving the multimedia file). In some cases, the authentication platform may generate the data identifying the authorized action in real-time by generating the random sequence of characters, the instructions identifying the particular movement or motion, and/or the like. Additionally, or alternatively, the authentication platform may randomly select a data type associated with the authorized action (e.g., which may dictate whether the user is to speak the authorized action or to make a movement or motion as the authorized action).

In this way, security of the transaction card activation process is improved relative to inferior techniques that may be used to authenticate that the individual attempting to activate a transaction card is the individual to which the transaction card was issued. Furthermore, by improving security of the transaction card activation process, processing and memory resources are conserved relative to inferior techniques that generate more reports of incidents of fraud, that generate more alerts of incidents of fraud, that provide more reimbursement information and/or notifications of reimbursements associated with fraud, and/or the like.

In some implementations, the authentication platform may obtain the data identifying the authorized action. For example, the authentication platform may be configured with the data identifying the authorized action. In this case, as shown, a data structure may associate the configured data identifying the authorized action and the transaction card identifier, and the authentication platform may search (e.g., query) the data structure for the data upon receiving the request from the user device. As shown by reference number 130, the authentication platform may provide the data identifying the authorized action to the user device.

In some implementations, the data identifying the authorized action may be provided to the user device when the application is approved. For example, the data identifying the authorized action may be generated by the authentication platform or by the transaction card application server after the user device opts-in to using the activation procedure. In this case, the authentication platform or the transaction card application server may provide the data identifying the authorized action to the user device when the application is approved.

In this way, the user device is able to receive activation instructions indicating how to activate the transaction card.

As shown in FIG. 1C, and by reference number 135, the user device may generate a multimedia file by recording the video. For example, the user may interact with the recording feature of the application to record a video that displays the face of the user, that displays the transaction card identifier, that shows the user performing the authorized action, that displays the form of user identification, that shows the user taking a self-recorded video (e.g., a selfie video), and/or some combination thereof. As shown as an example, the user may record a video that displays the face of the user, that displays the transaction card identifier, and that includes an audio of the user stating "I am an authorized user" (e.g., which may be the authorized action indicated by the activation instructions).

As shown by reference number 140, the user device may provide the multimedia file to the authentication platform. As shown by reference number 145, the authentication platform may execute a first authentication procedure to determine whether to activate the transaction card. For example, the authentication platform may execute a first authentication procedure to verify whether contents of the multimedia file (e.g., image data, audio data, etc.) satisfy the activation instructions.

In some implementations, the authentication platform may be configured with instructions that are to be performed before the authentication platform is to proceed with authenticating the contents of the multimedia file. For example, the authentication platform may be configured with instructions that may be executed to determine whether the multimedia file satisfies a set of preliminary requirements. The set of preliminary requirements may include a requirement that the multimedia file includes data of a certain data type (e.g., video, video and audio, etc.), a requirement that the multimedia file is of a certain duration, a requirement that the multimedia file includes a particular object (e.g., a human face, a human arm, a transaction card, a user identification document, etc.), a requirement that the multimedia file includes audio of a human voice, and/or the like. In this case, the authentication platform may analyze the multimedia file to determine whether all (or some) of the requirements are satisfied before proceeding to authenticate the contents of the multimedia file.

If all the requirements are satisfied, the authentication platform may proceed with authenticating the contents of the multimedia file. If one or more of the requirements are not satisfied, the authentication platform may not proceed with authenticating the contents of the multimedia file and may, instead, notify the user device that the transaction card is unable to be activated. In this way, the authentication platform conserves processing resources that would otherwise be used to perform authentication on the contents of the multimedia file.

As an example, assume that the activation instructions state the following: the multimedia file is to be a video of at least six seconds in length, the video is to include a selfie containing the face of the user, the video is to include the transaction card with the transaction card identifier facing the camera of the user device, the video is to include the user saying "I am an authorized user," the video is to include some form of user identification (e.g., a driver's license), and the video is to be a self-recorded video. Before authenticating the actual contents of the multimedia file, the authentication platform may execute the instructions to determine whether the multimedia file satisfies the set of preliminary requirements.

For example, to determine whether the multimedia file includes a video of at least six seconds in length, the authentication platform may analyze metadata associated with the multimedia file to verify that the multimedia file has a file format that is a video file format and that the length of the multimedia file is at least six seconds in length. If the multimedia file does not satisfy this requirement, the authentication platform may stop processing the multimedia file and may notify the user device that the transaction card is unable to be activated at this time. In this way, the authentication platform conserves processing resources that would otherwise be used to perform other pre-authentication operations on the multimedia file and/or authentication on the contents of the multimedia file.

Additionally, or alternatively, because the activation instructions indicate that the video is to include a selfie containing the face of the user, the authentication platform may determine whether the video includes a human face (regardless of whether the human face is the face of the user). In this case, the authentication platform may process the video using a facial recognition technique to verify that the video includes a human face. If the multimedia file does not satisfy this requirement, the authentication platform may stop processing the multimedia file and may notify the user device that the transaction card cannot be activated at this time. In this way, the authentication platform conserves processing resources that would otherwise be used to perform other pre-authentication operations on the multimedia file and/or authentication on the contents of the multimedia file.

Additionally, or alternatively, because the activation instructions indicate that the video is to include a transaction card with a transaction card identifier facing towards the camera of the user device, the authentication platform may determine whether the video includes a transaction card (e.g., any transaction card, a particular transaction card, etc.). In this case, the authentication platform may process the video using an object recognition technique to verify that the video includes a transaction card and that the transaction card identifier is present and facing towards the camera of the user device. If the multimedia file does not satisfy this requirement, the authentication platform may stop processing the multimedia file and may notify the user device that the transaction card is unable to be activated at this time. In this way, the authentication platform conserves processing resources that would otherwise be used to perform other pre-authentication operations on the multimedia file and/or authentication on the contents of the multimedia file.

Additionally, or alternatively, because the activation instructions indicate that the video is to include audio, the authentication platform may perform an audio recognition technique to verify that the video includes a human voice saying something (regardless of what the voice is actually saying). If the multimedia file does not satisfy this requirement, the authentication platform may stop processing the multimedia file and may notify the user device that the transaction card cannot be activated at this time. In this way, the authentication platform conserves processing resources that would otherwise be used to perform other pre-authentication operations on the multimedia file and/or authentication on the contents of the multimedia file.

Additionally, or alternatively, because the activation instructions indicate that the video is to include some form of user identification (e.g., a driver's license), the authentication platform may determine whether the video includes some form of user identification (e.g., any driver's license). In this case, the authentication platform may process the video using an object recognition technique and/or a text recognition technique to verify that the video includes the form of user identification. If the multimedia file does not satisfy this requirement, the authentication platform may stop processing the multimedia file and may notify the user device that the transaction card cannot be activated at this time. In this way, the authentication platform conserves processing resources that would otherwise be used to perform other pre-authentication operations on the multimedia file and/or authentication on the contents of the multimedia file.

Additionally, or alternatively, because the activation instructions indicate that the video is to be a self-recorded video, the authentication platform may determine whether the video includes a portion of a human arm (e.g., a portion of any human arm). In this case, the authentication platform may process the video using an object recognition technique to verify that the video includes a human arm. If the multimedia file does not satisfy this requirement, the authentication platform may stop processing the multimedia file and may notify the user device that the transaction card cannot be activated at this time. In this way, the authentication platform conserves processing resources that would otherwise be used to perform other pre-authentication operations on the multimedia file and/or authentication on the contents of the multimedia file.

In some implementations, one or more of the above-mentioned pre-authentication processing steps may be performed by the user device. For example, before the user device provides the authentication platform with the multimedia file, the user device may determine if the multimedia file is of a particular data type, if the multimedia file is of a particular duration, if the multimedia file includes particular objects, and/or the like. In this way, the user device may be able to identify that the multimedia does not satisfy preliminary requirements, thereby conserving network resources that would otherwise be used to transmit the multimedia file over a network to the authentication platform.

In some implementations, the user device and the authentication platform may both perform one or more of the above-mentioned pre-authentication processing steps. For example, the user device and the authentication platform may both perform pre-authentication processing steps to ensure that the multimedia file has not been intercepted and tampered with while being transmitted to the authentication platform. In this way, the user device and the authentication platform may introduce redundancies that reduce a likelihood of an unauthorized user successfully authenticating the transaction card.

In this way, the authentication platform is able to perform pre-authentication processing, thereby conserving processing resources and/or network resources relative to an inferior platform that expends or utilizes an inefficient amount of processing resources or network resources by performing complete authentication procedures.

Figure 1D:
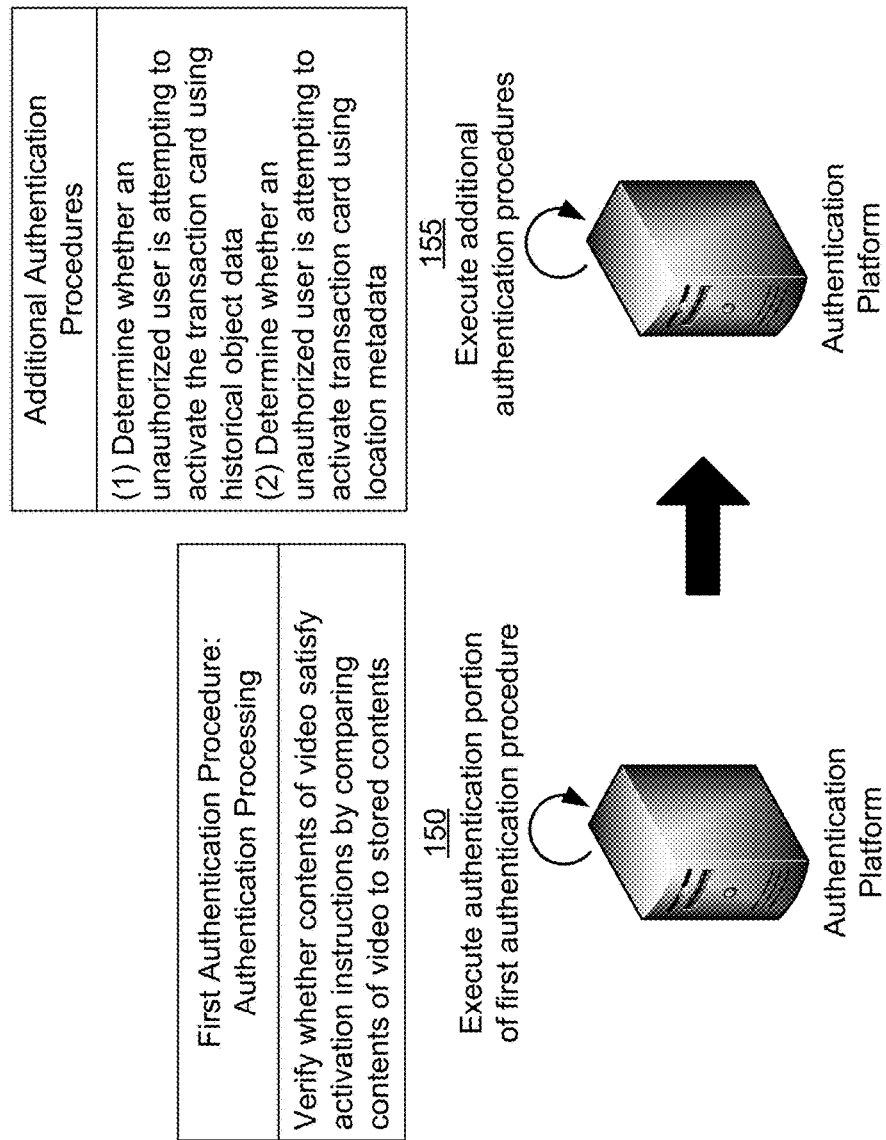

As shown in FIG. 1D, and by reference number 150, the authentication platform may execute an authentication portion of the first authentication procedure. For example, the authentication platform may authenticate the contents of the multimedia file by determining whether the contents of the multimedia file satisfy the activation instructions.

If the multimedia file satisfies the activation instructions, the authentication platform may activate the transaction card or may perform additional authentication procedures that are described further herein. If the multimedia file does not satisfy the activation instructions, the authentication platform may notify the user device that the transaction card is unable to be activated. In some cases, the authentication platform may stop the authentication procedure when the authentication platform determines that one activation instruction, of the activation instructions, has not been satisfied. In this way, the authentication platform conserves processing resources that would otherwise be used to perform other authentication operations on the contents of the multimedia file.

In some implementations, the authentication platform may determine whether the contents of the multimedia file satisfy the activation instructions by comparing the contents of the multimedia file to stored contents. The stored contents may correspond to the activation instructions and may include, for example, data identifying the user's face (e.g., if the user has previously used the activation procedure to activate other transaction cards), data identifying the transaction card identifier of the transaction card, data identifying the authorized action (e.g., data identifying a word or phrase that the user was instructed to speak, data describing a particular movement or motion that the user was instructed to make, etc.). Additionally, or alternatively, the stored contents may include data identifying a form of user identification, data identifying that the video was self-recorded (e.g., data identifying a human arm, data that may be used to identify a distance between the user device and the face of the user, data that may be used to identify an angle between the user device and the face of the user, etc.), and/or the like.

Restating the previous example, assume that the activation instructions indicate the following: the video is to include a selfie containing the face of the user, the video is to include the transaction card with the transaction card identifier facing the camera of the user device, the video is to include the user saying "I am an authorized user," the video is to include some form of user identification (e.g., a driver's license), and the video is to be a self-recorded video. To authenticate the contents of the video, the authentication platform may compare the contents to the stored contents that correspond to the activation instructions.

For example, the authentication platform may determine whether the video includes a human face or the face of the user that was issued the transaction card. If the user has previously been issued transaction cards, the authentication platform may determine whether the video includes the face of the user to which the transaction card was issued. In this case, the authentication platform may use a facial recognition technique to identify object data identifying the face of the user, and may compare the object data to stored data identifying the face of the user to determine whether the video includes the face of the user. If the transaction card issued to the user is the user's first transaction card, the authentication platform may determine whether the video includes a human face (e.g., any human face, without attempting to match the human face to the face of the user to which the transaction card was issued). Because the authentication platform has already made this determination (e.g., during pre-authentication processing), the authentication platform may skip this determination and may, thus, conserve processing resources that would otherwise be used to re-verify that the video includes a human face.

Additionally, or alternatively, the authentication platform may determine whether the video includes the transaction card that was issued to the user. In this case, the authentication platform may process the video using an object recognition technique to identify object data identifying the transaction card and may analyze the object data to determine the characters of a transaction card identifier present on the transaction card. The authentication platform may compare the transaction card identifier to stored data identifying the transaction card identifier of the transaction card issued to the user to determine whether the video includes the correct transaction card (i.e., the transaction card issued to the user). In some implementations, the authentication platform may analyze the object data to determine whether the transaction card includes other identifying data (e.g., a card issuer identifier, the user's name, and/or the like). The authentication platform may compare the other identifying data to stored data associated with the transaction card issued to the user to determine whether the video includes the correct transaction card (i.e., the transaction card issued to the user).

Additionally, or alternatively, the authentication platform may determine whether the video includes audio data of the user saying "I am an authorized user." In this case, the authentication platform may convert an audio portion of the multimedia file from audio data to text data. Additionally, the authentication platform may compare the text data to stored data identifying the authorized action (e.g., stored text of the phrase "I am an authorized user") to determine whether the video includes the user saying "I am an authorized user."

In other cases, the authentication platform may determine whether the video includes data identifying the user performing a particular movement or motion. In this case, the authentication platform may convert the multimedia file into a set of frames, may select a frame that is likely to include the particular movement or motion (e.g., a middle frame in the video), and may execute an image scanning technique (e.g., a computer vision technique) to scan the selected frame to identify image data for the particular movement or motion. In this case, the image scanning technique may also convert the identified image data to text data for further processing. Additionally, the authentication platform may compare the converted text data to stored data identifying the particular movement or motion to determine whether the video includes the user performing the particular movement or motion.

As an example, the authentication platform may execute an image scanning technique to identify a particular body part (e.g., a mouth, a hand, etc.). In this example, the authentication platform may identify the particular body part in a first frame, and may identify the particular body part in one or more subsequent frames. Additionally, the authentication platform may generate a movement arc to determine a possible range of motion of the particular body part from the first frame to the one or more subsequent frames. Furthermore, the authentication platform may compare the movement arc to a particular movement or motion that is required for authentication.

Additionally, or alternatively, the authentication platform may determine whether the video includes a form of user identification. For example, the authentication platform may determine whether the video includes a form of user identification during pre-processing, as described above. In some cases, the authentication platform may determine whether user identification is shown in the video during pre-processing, and may determine whether the user identification is valid while authenticating the contents of the multimedia file. In this case, the authentication platform may use an object recognition technique to identify object data identifying the user identification, and may analyze the object data to determine whether the user identification is valid (e.g., by comparing a current date to an expiration date of the user identification, by comparing a name included on the user identification and the name of the user, and/or the like).

Additionally, or alternatively, the authentication platform may determine whether the video is a self-recorded video. In this case, the authentication platform may process the video using an object recognition technique to identify object data identifying a portion of the arm of the user. Additionally, the authentication platform may compare the object data identifying the portion of the arm of the user to stored data identifying a human arm to determine whether the video is a self-recorded video.

Furthermore, the authentication platform may identify a distance between the user device and the face of the user. In this case, the authentication platform may determine whether the video is a self-recorded video by comparing the distance between the user device and the face of the user to a range of distances that are often associated with self-recorded videos. As an example, a distance between the user device and the face of the user may be limited by the length of the user's arm (e.g., unless a recording device is used that is separate from the user device), so the length of an average human arm, or the length of the longest human arm, may be used for the comparison.

Furthermore, the authentication platform may identify an angle between the user device and the face of the user. In this case, the authentication platform may determine whether the video is a self-recorded video by comparing the angle to a range of angles that are often associated with self-recorded videos. As an example, an angle between the user device and the face of the user may be limited by the range of motion of the user's arm, so an average range of motion of a human arm, or a maximum range of motion of the longest human arm, may be used for the comparison.

In some implementations, one or more pre-processing determinations and/or one or more authentication determinations may be performed using thresholds. For example, in some cases, a user may record a video that includes an attempt to perform the authorized action, but the user may not perform a perfect authorized action, or may perform the authorized action using slightly different words, phrases, motions, and/or movements than those stored by the authentication platform. As an example, the user may state "I'm the authorized user" when the authorization instructions are to state "I am an authorized user." In this case, the authentication platform may use a threshold value when determining whether a particular preliminary requirement or activation instruction has been satisfied.

As shown by reference number 155, the authentication platform may execute one or more additional authentication procedures. For example, the authentication platform may execute one or more additional authentication procedures to determine whether an unauthorized user is attempting to activate the transaction card.

In some implementations, the authentication platform may execute an additional authentication procedure that uses historical object data to determine whether an unauthorized user is attempting to activate the transaction card. For example, the authentication platform may compare object data identifying the face of the user and historical object data that identifies faces of users that have been used to authenticate other transaction cards. In this case, the authentication platform may determine a number of times that the object data has been used to authenticate the other transaction cards based on comparing the object data and the historical object data.

Additionally, the authentication platform may determine whether the number of times that the object data has been used to authenticate other transaction cards satisfies a threshold value. The threshold value may serve as an indicator of a fraudulent attempt to activate the transaction card (e.g., because an individual activating five, ten, twenty, or more transaction cards is likely to be committing fraud). In this case, the authentication platform may determine whether to activate the transaction card based on whether the number of times that the object data has been used to authenticate other transaction cards satisfies the threshold value.

Additionally, or alternatively, the authentication platform may execute an additional authentication procedure that uses location metadata to determine whether an unauthorized user is attempting to activate the transaction card. For example, assume the authentication platform receives location metadata identifying a geographic location of the user device (e.g., at a time when the user device submits the multimedia file). Further assume the authentication platform stores additional location metadata identifying a geographic location of the user device (or a different device accessible to the authorized user that applied for the transaction card) at a time when the user device submitted an application for the transaction card or a geographic location to which the transaction card was issued. The location metadata and the additional location metadata may be used as an indicator of fraudulent activity because an authorized user is likely to activate the transaction card in the same geographic region as where the authorized user applied for the transaction card and/or to which the transaction card was issued.

In this case, the authentication platform may compare the location metadata and the additional location metadata to determine whether the location metadata satisfies a distance threshold with the additional location metadata. Additionally, the authentication platform may determine whether to activate the transaction card based on whether the location metadata satisfies the distance threshold with the additional location metadata.

In some implementations, the authentication platform may selectively identify and perform one or more authentication procedures or one or more steps of the one or more authentication procedures. For example, the authentication platform may selectively identify authentication procedures or steps of authentication procedures to perform based on whether the user is a new customer or an existing customer, based on whether the user device has opted-in to location tracking, based on user preferences (e.g., identified during the transaction card application process), and/or the like. By selectively identifying and performing authentication procedures or steps of authentication procedures, the authentication platform conserves processing resources relative to an inferior platform that is unable to intelligently identify optimal authentication procedures or steps of authentication procedures to perform.

Additionally, or alternatively, the authentication platform may selectively identify and perform authentication procedures using machine learning. For example, the authentication platform may train a machine learning model on historical object data identifying results of historical activation procedures, user profile information for individuals that performed the activation procedures (e.g., personal information, demographic information, etc.), device information for devices used to generate the multimedia file used in the activation procedures (e.g., a device identifier, logs identifying particular buttons or interfaces that the user interacted with while using the application, etc.), and/or the like. The machine learning model may be trained to identify patterns and/or trends associated with particular types of individuals or particular characteristics of individuals, and the patterns and/or trends may be used to selectively identify optimal activation instructions to issue and/or authentication procedures to perform.

In this case, the authentication platform may provide the contents of the multimedia file as input to the machine learning model, which may cause the machine learning model to output a confidence value for each possible activation instruction, whereby the confidence value indicates a likelihood of the activation being effective to use for the activation procedure. Additionally, or alternatively, the authentication platform may provide the contents of the multimedia file as input to the machine learning model, which may cause the machine learning model to output a confidence value for each authentication procedure and/or each step within an authentication procedure, whereby the confidence value indicates a likelihood of the authentication procedure and/or the step within the authentication procedure being an effective procedure or step to use for the activation procedure.

In some implementations, the authentication platform may determine whether to activate the transaction card by executing one or more of the above described authentication procedures and/or one or more similar authentication procedures. Additionally, or alternatively, the authentication platform may determine whether to activate the transaction card by executing one or more steps of one or more authentication procedures, such that any step of any authentication procedure may be combined with one or more other steps of other authentication procedures.

By executing the one or more authentication procedures, the authentication platform is able to make a secure determination as to whether to activate the transaction card.

Figure 1E:
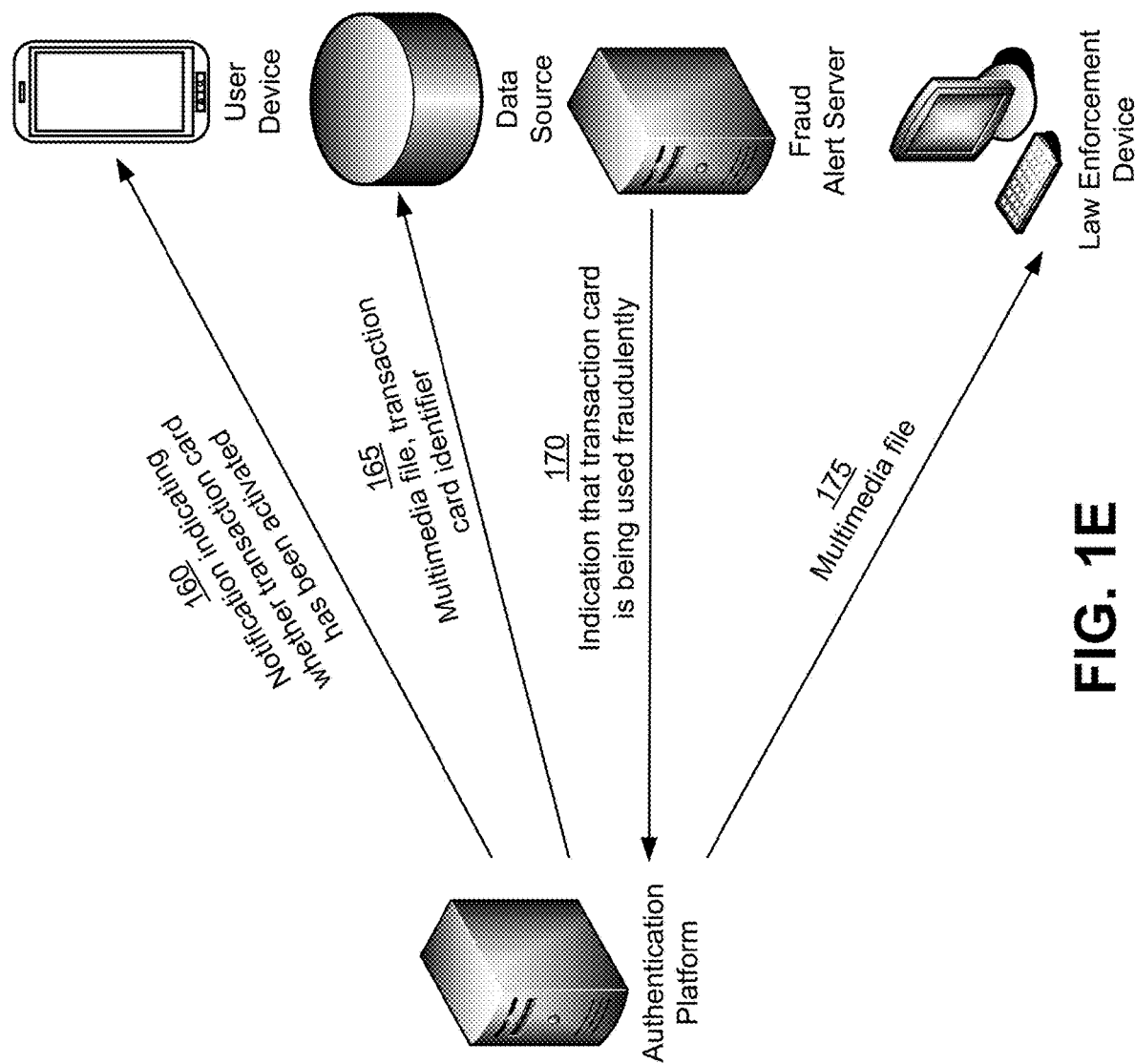

As shown in FIG. 1E, and by reference number 160, the authentication platform may provide, to the user device, a notification indicating whether the transaction card has been activated. As shown by reference number 165, the authentication platform may provide the multimedia file and the transaction card identifier to a data source. For example, the authentication platform may provide the multimedia file and the transaction card identifier to the data source to be stored in association with each other for a threshold time period.

As shown by reference number 170, the authentication platform may provide, to a fraud alert server, an indication that the transaction card is being used fraudulently. For example, the fraud alert server may detect, or may receive notice of, one or more suspicious transactions associated with the transaction card that had been activated. In this case, the fraud alert server may provide an indication that the transaction card is being used fraudulently to the authentication platform.

As shown by reference number 175, the authentication platform may provide the multimedia file to a law enforcement device associated with a law enforcement agency. For example, the authentication platform may provide the multimedia file to the law enforcement device such that the law enforcement agency may use the contents of the multimedia file (e.g., the face of the user) as potential evidence of fraud.

In some implementations, the authentication platform may provide additional information to the law enforcement device. For example, the authentication platform may provide location information of the user device at a time when the multimedia file was created, location information of a current location of the user device, and/or any other information that may be used to locate the user who attempted to active the transaction card.

By using an improved transaction card activation procedure, the authentication platform conserves processing resources and/or network resources that might otherwise be used to generate and/or provide reports or alerts of incidents of fraud, conserves processing resources and/or network resources that might otherwise be used to generate and provide reimbursements and/or notifications of reimbursements, and/or the like. Additionally, the authentication platform conserves memory resources that might be used to store reports or alerts of incidents of fraud, conserves memory resources that might be used to store reimbursement information and/or notifications of reimbursements associated with fraud, and/or the like.

As indicated above, FIGS. 1A-1E are provided merely as an example. Other examples are possible and may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation 100 may perform one or more functions described as being performed by another set of devices of example implementation 100.

Figure 2:
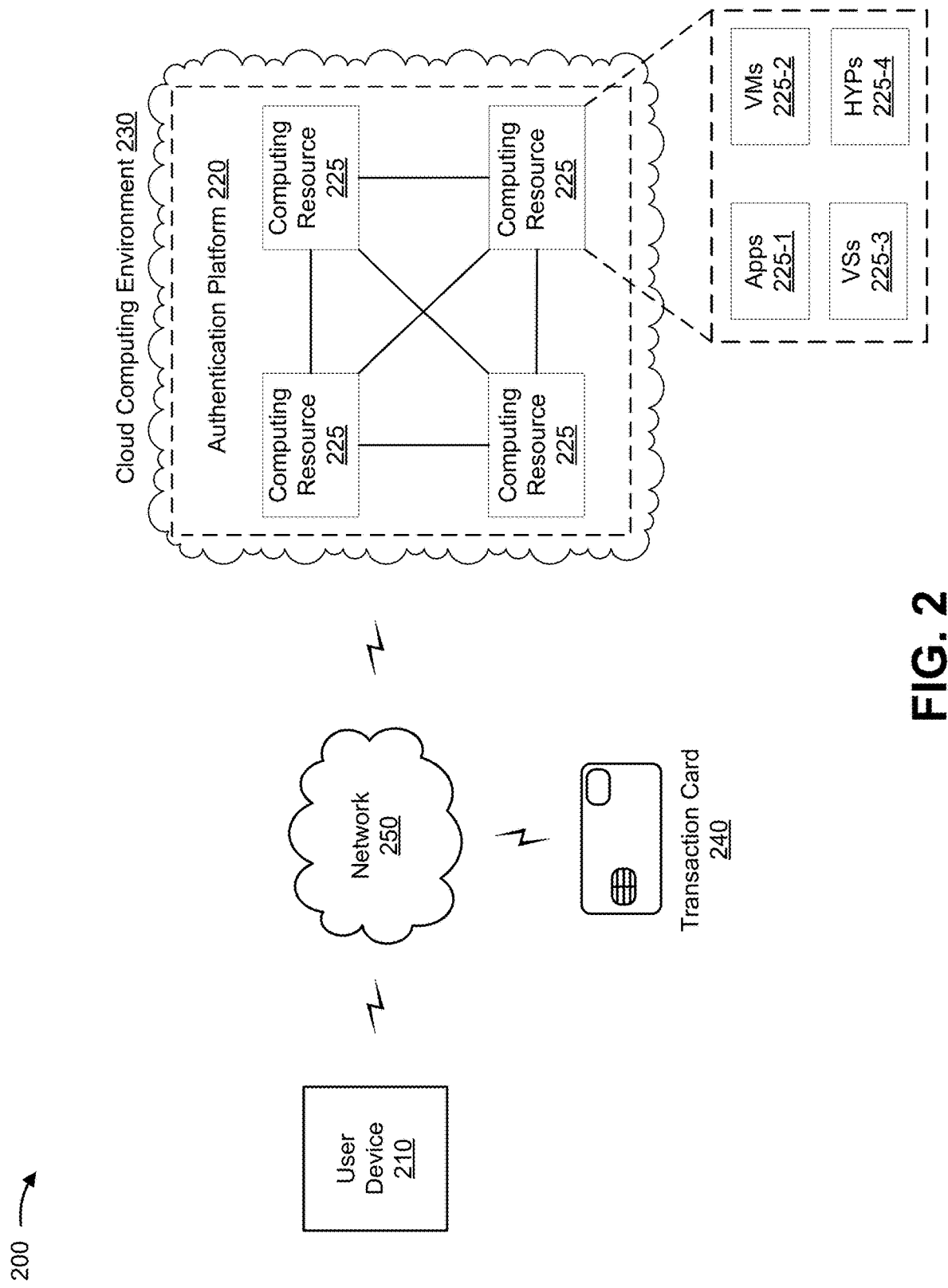
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an authentication platform 220 hosted by a cloud computing environment 230, a transaction card 240, and/or a network 250. Devices of environment 200 may interconnect via wired connections, wireless connections, or a combination of wired and wireless connections.

User device 210 includes one or more devices capable of receiving, generating, storing, processing, and/or providing information associated with a transaction card. For example, user device 210 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, user device 210 may provide a request for an authentication code to authentication platform 220. In some implementations, user device 210 may receive the authentication code from authentication platform 220. In some implementations, user device 210 may provide a media file to authentication platform 220. In some implementations, user device 210 may receive a notification indicating whether a transaction card has been activated from authentication platform 220.

Authentication platform 220 includes one or more devices capable of receiving, generating, storing, processing, and/or providing information associated with a transaction card. For example, authentication platform 220 may include a server device (e.g., a host server, a web server, an application server, etc.), a data center device, or a similar device. In some implementations, authentication platform 220 may provide a media file, information regarding an authorized action, a transaction card identifier, and/or associations between the media file, the authorized action, and the transaction card identifier, to a data source.

In some implementations, as shown, authentication platform 220 may be hosted in cloud computing environment 230. Notably, while implementations described herein describe authentication platform 220 as being hosted in cloud computing environment 230, in some implementations, authentication platform 220 might not be cloud-based (i.e., may be implemented outside of a cloud computing environment) or might be partially cloud-based.

Cloud computing environment 230 includes an environment that hosts authentication platform 220. Cloud computing environment 230 may provide computation, software, data access, storage, and/or other services that do not require end-user knowledge of a physical location and configuration of system(s) and/or device(s) that host authentication platform 220. As shown, cloud computing environment 230 may include a group of computing resource 225 (referred to collectively as "computing resources 225 and individually as "computing resource 225").

Computing resource 225 includes one or more personal computers, workstation computers, server devices, or another type of computation and/or communication device. In some implementations, computing resource 225 may host authentication platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with authentication platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Transaction card 240 includes a transaction card capable of receiving, storing, generating, and/or providing information associated with an activation procedure. Transaction card 240 is capable of storing and/or communicating data for a point of sale (PoS) transaction with a transaction terminal. For example, transaction card 240 may store or communicate data including account information (e.g., an account identifier, a cardholder identifier, etc.), expiration information of transaction card 240, banking information, transaction information (e.g., a payment token), and/or the like. For example, to store or communicate the data, transaction card 240 may include a magnetic strip and/or an integrated circuit (IC) chip (e.g., a EUROPAY®, MASTERCARD®, VISA® (EMV) chip, or the like). In some implementations transaction card 240 may be activated by receiving instructions from authentication platform 220 or from a different server device capable of generating and providing instructions to activate transaction card 240.

In some implementations, transaction card 240 may include an antenna to communicate data associated with transaction card 240. The antenna may be a passive radio frequency (RF) antenna, an active RF antenna, and/or a battery-assisted RF antenna. In some implementations, transaction card 240 may be a smart transaction card, capable of communicating wirelessly (e.g., via Bluetooth, Bluetooth Low Energy (BLE), near-field communication (NFC), and/or the like) with a computing device, such as a transaction terminal, a digital wallet, a user device 210, and/or another device. In some implementations, transaction card 240 may communicate with a transaction terminal to complete a transaction (e.g., based on being moved within communicative proximity of the transaction terminal).

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
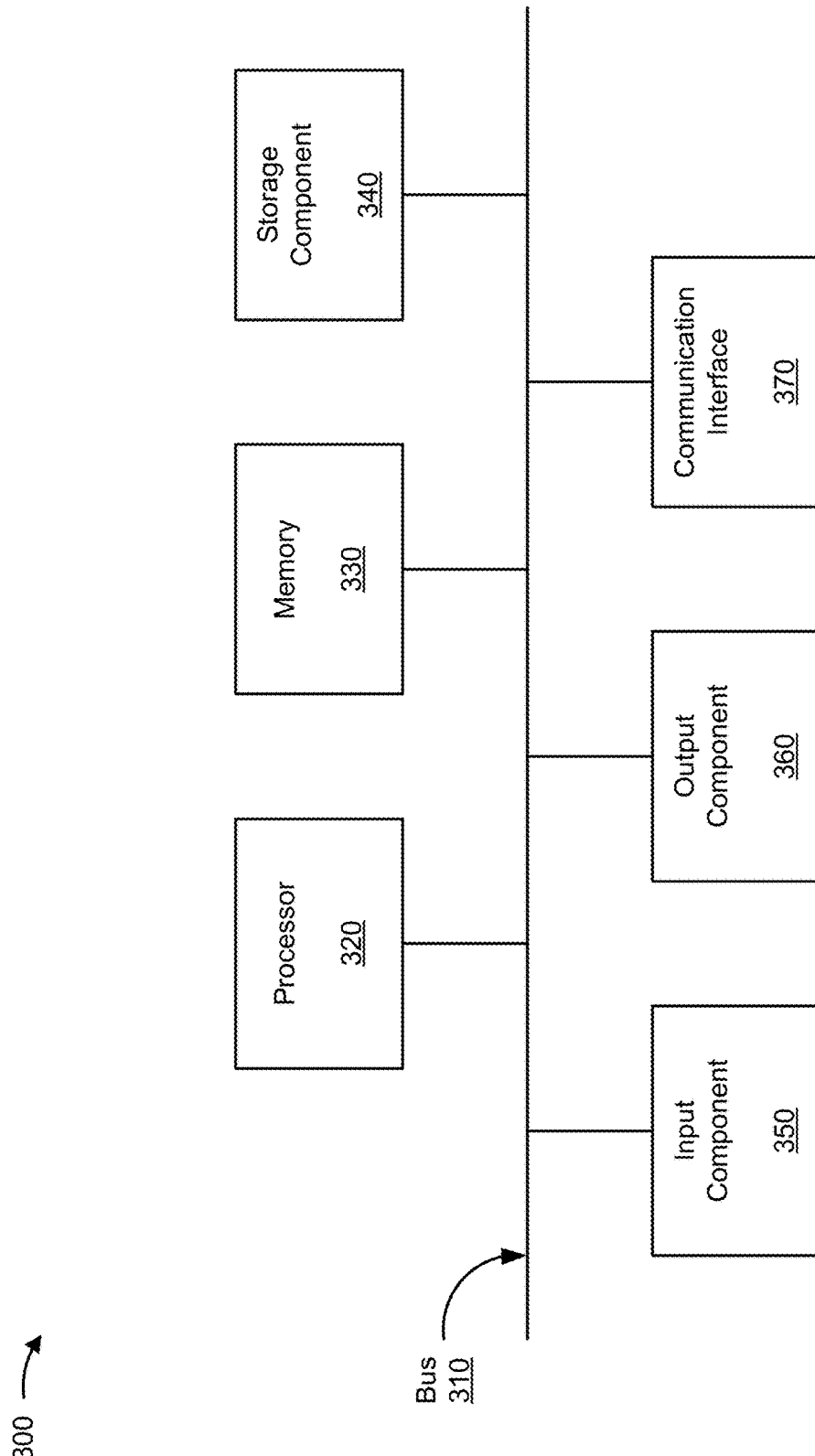
FIG. 3 is a diagram of example components of one or more devices of FIG. 2.

FIG. 3 is a diagram of example components of a device 300. Device 300 may correspond to user device 210, authentication platform 220, and/or transaction card 240. In some implementations, user device 210, authentication platform 220, and/or transaction card 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for activating a transaction card by executing one or more authentication procedures that include an authentication procedure to verify that a multimedia file received from a user device includes data identifying a face of a user, data identifying a transaction card identifier, and data identifying instructions of an authorized action. In some implementations, one or more process blocks of FIG. 4 may be performed by authentication platform 220. In some implementations, one or more process blocks of FIG. 4 may be performed by another device or a group of devices separate from or including authentication platform 220, such as user device 210 and/or transaction card 240.

As shown in FIG. 4, process 400 may include receiving, from a user device and as part of a procedure for activating a transaction card, a multimedia file that is to be used to authenticate the transaction card, the multimedia file including a first set of data identifying a face of a user, a second set of data identifying a transaction card identifier, and a third set of data identifying an authorized action (block 410). For example, authentication platform 220 (e.g., computing resource 225, processor 320, input component 350, communication interface 370, etc.) may receive, from user device 210 and as part of a procedure for activating transaction card 240, a multimedia file that is to be used to authenticate transaction card 240. The multimedia file may include a first set of data identifying a face of a user, a second set of data identifying a transaction card identifier, and a third set of data identifying an authorized action.

As further shown in FIG. 4, process 400 may include determining whether to authenticate the transaction card by executing one or more authentication procedures that include a first authentication procedure that is executed to verify that the multimedia file includes the first set of data, the second set of data, and the third set of data (block 420). For example, authentication platform 220 (e.g., computing resource 225, processor 320, memory 330, storage component 340, etc.) may determine whether to authenticate transaction card 240 by executing one or more authentication procedures that include a first authentication procedure that is executed to verify that the multimedia file includes the first set of data, the second set of data, and the third set of data.

As further shown in FIG. 4, process 400 may include determining whether to activate the transaction card based on whether the transaction card has been authenticated (block 430). For example, authentication platform 220 (e.g., computing resource 225, processor 320, memory 330, storage component 340, etc.) may determine whether to activate transaction card 240 based on whether transaction card 240 has been authenticated.

As further shown in FIG. 4, process 400 may include providing, to the user device, a notification indicating whether the transaction card has been activated (block 440). For example, authentication platform 220 (e.g., computing resource 225, processor 320, output component 36, communication interface 370, etc.) may provide, to user device 210, a notification indicating whether transaction card 240 has been activated based on whether transaction card 240 has been activated.

Process 400 may include additional implementations, such as any single implementation or any combination of implementations described below.

In some implementations, authentication platform 220 may receive a multimedia file wherein the first set of data is image data, the second set of data is image data, and the third set of data is audio data.

In some implementations, authentication platform 220 may convert the multimedia file into a set of frames to cause the first set of data and the second set of data to be converted from a first data type to a second data type. Additionally, authentication platform 220 may process a frame, of the set of frames, to identify the converted first set of data identifying the face of the user and the converted second set of data identifying the transaction card identifier. Additionally, authentication platform 220 may determine whether the first set of data that has been converted satisfies a first threshold level of similarity with a fourth set of data identifying properties of a human face. Additionally, authentication platform 220 may determine whether the second set of data that has been converted satisfies a second threshold level of similarity with a fifth set of data identifying the transaction card identifier.

Additionally, authentication platform 220 may convert the third set of data identifying the authorized action from a third data type to the second data type. Additionally, authentication platform 220 may determine whether the third set of data that has been converted satisfies a third threshold level of similarity with a sixth set of data identifying the authorized action. Additionally, authentication platform 220 may determine whether to activate the transaction card based on whether the first set of data satisfies the first threshold level of similarity with the fourth set of data, based on whether the second set of data satisfies the second threshold level of similarity with the fifth set of data, and based on whether the third set of data satisfies the third threshold level of similarity with the sixth set of data.

In some implementations, authentication platform 220 may receive a multimedia file that includes the first set of data, the second set of data, the third set of data, and a fourth set of data identifying a form of user identification. Additionally, authentication platform 220 may determine whether the first set of data satisfies a first threshold level of similarity with a fifth set of data identifying generic properties of a human face. Additionally, authentication platform 220 may determine whether the second set of data satisfies a second threshold level of similarity with a sixth set of data identifying the transaction card identifier.

Additionally, authentication platform 220 may determine whether the third set of data satisfies a third threshold level of similarity with a seventh set of data identifying the authorized action. Additionally, authentication platform 220 may determine whether the fourth set of data satisfies a fourth threshold level of similarity with an eighth set of data identifying the form of user identification. Additionally, authentication platform 220 may determine whether to activate the transaction card based on whether the first set of data satisfies the first threshold level of similarity with the fourth set of data, based on whether the second set of data satisfies the second threshold level of similarity with the fifth set of data, based on whether the third set of data satisfies the third threshold level of similarity with the sixth set of data, and based on whether the fourth set of data satisfies the fourth threshold level of similarity with the eighth set of data.

In some implementations, authentication platform 220 may execute a second authentication procedure of the one or more authentication procedures. For example, authentication platform 220 may compare the first set of data identifying the face of the user and historical object data identifying faces of users that have been used to authenticate other transaction cards. Additionally, authentication platform 220 may determine a number of times that the first set of data has been used to authenticate the other transaction cards based on comparing the first set of data and the historical object data.

Additionally, authentication platform 220 may determine whether the number of times that the first set of data has been used to authenticate other transaction cards satisfies a threshold value. The threshold value may be an indicator of a fraudulent attempt to activate the transaction card. Additionally, authentication platform 220 may determine whether to activate the transaction card based on whether the number of times that the first set of data has been used to authenticate the other transaction cards satisfies the threshold value.

In some implementations, authentication platform 220 may receive, before executing the one or more authentication procedures, location metadata identifying a geographic location of the user device. Additionally, authentication platform 220 may execute a second authentication procedure of the one or more authentication procedures. For example, authentication platform 220 may compare the location metadata and additional location metadata identifying a geographic location (or geographic region) of a particular device or the user device at a time when the particular device or the user device submitted an application for the transaction card. Additionally, authentication platform 220 may determine whether the location metadata satisfies a distance threshold with the additional location metadata. Additionally, authentication platform 220 may determine whether to activate the transaction card based on whether the location metadata satisfies the distance threshold with the additional location metadata.

In some implementations, authentication platform 220 may determine to activate the transaction card based on determining that the transaction card has been authenticated. In some implementations, authentication platform 220 may store the first set of data identifying the face of the user for a threshold time period. In some implementations, authentication platform 220 may receive, within the threshold time period, an indication that the transaction card is being used fraudulently. In some implementations, authentication platform 220 may provide the first set of data to a device associated with a law enforcement agency.

In some implementations, authentication platform 220 may determine whether the multimedia file includes data that satisfies a first threshold level of similarity with a fourth set of data identifying generic properties of a human face. Additionally, authentication platform 220 may determine whether the multimedia file includes data that satisfies a second threshold level of similarity with a fifth set of data identifying generic properties of transaction cards. Additionally, authentication platform 220 may determine whether the second set of data identifying the transaction card identifier satisfies a third threshold level of similarity with the fifth set of data.

Additionally, authentication platform 220 may determine whether the multimedia file includes audio data. Additionally, authentication platform 220 may determine whether the third set of data identifying the authorized action satisfies a fourth threshold level of similarity with a sixth set of data identifying the authorized action based on whether the multimedia file includes the audio data. Additionally, authentication platform 220 may determine whether to authenticate the transaction card based on whether the first set of data satisfies the first threshold level of similarity with the fourth set of data, based on whether the second set of data satisfies the third threshold level of similarity with the fifth set of data, and based on whether the third set of data satisfies the fourth threshold level of similarity with the sixth set of data.

In some implementations, authentication platform 220 may process the multimedia file to determine whether one or more rules are satisfied. The one or more rules may include a first rule indicating that the multimedia file includes a fourth set of data identifying at least a portion of a human arm, a second rule indicating that a distance between the user device and the face of the user satisfies a distance threshold, a third rule indicating that an angle between the user device and the face of the user satisfies an angle threshold, and/or the like. Additionally, authentication platform 220 may determine whether to authenticate the transaction card based on whether the one or more rules are satisfied.

In some implementations, authentication platform 220 may determine whether the multimedia file satisfies a set of preliminary requirements. The set of preliminary requirements may include a requirement that the multimedia file includes data of a particular data type, a requirement that the multimedia file is of a particular duration, a requirement that the multimedia file includes a particular object, a requirement that the multimedia file includes audio of a human voice, and/or the like.

In some implementations, authentication platform 220 may identify a set of preliminary requirements that are to be satisfied before authorizing the contents of the multimedia file. Additionally, authentication platform 220 may determine whether a duration of the multimedia file is of a particular duration based on a first preliminary requirement indicating that the multimedia file is to be of the particular duration. Additionally, authentication platform 220 may determine whether the multimedia file includes data of a particular data type based on a second preliminary requirement indicating that the multimedia is to include the data of the particular data type. Additionally, authentication platform 220 may determine whether the multimedia file includes a particular object based on a third preliminary requirement indicating that the multimedia file is to include the particular object.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, authentication platform 220 is able to deter fraudulent uses of transaction card 240 and/or is able to catch an unauthorized user that fraudulently uses transaction card 240. By deterring fraudulent uses of transaction card 240, authentication platform 220 conserves processing resources that might otherwise be used to generate reports of incidents of fraud, conserves processing resources that might be used to generate alerts of incidents of fraud, conserves processing resources that might be used to generate reimbursements and/or notifications of reimbursement for customer devices after incidents of fraud, and/or the like.

Additionally, authentication platform 220 conserves network resources that might otherwise be used to provide reports of incidents of fraud to one or more devices, conserves network resources that might be used to provide alerts of incidents of fraud to one or more devices, conserves network resources that might be used to provide reimbursements and/or notifications of reimbursement to one or more devices, and/or the like. Furthermore, authentication platform 220 conserves memory resources that might be used to store reports of incidents of fraud, conserves memory resources that might be used to store alerts of incidents of fraud, conserves memory resources that might be used to store reimbursement information and/or notifications of reimbursements associated with fraud, and/or the like.

Additionally, authentication platform 220 efficiently and effectively utilizes processing resources and/or network resources. For example, authentication platform 220, while capable of executing the one or more authentication procedures that each include multiple authentication steps, is able to selectively identify and perform particular authentication procedures or particular steps within authentication procedures, thereby efficiently and effectively utilizing process resources and/or network resources relative to an inferior platform that is unable to intelligently identify optimal authentication procedures or steps of authentication procedures to perform.

The foregoing disclosure provides illustration and description, but is not intended to be exhaustive or to limit the implementations to the precise form disclosed. Modifications and variations are possible in light of the above disclosure or may be acquired from practice of the implementations.

To the extent embodiments and/or implementations described herein utilize features of an application (e.g., a camera, a phone, etc.), files, and/or the like, that require permissions (e.g., features and/or files relating personal information of individuals), it should be understood that such information is to be used in accordance with all applicable laws concerning protection of personal information. Furthermore, in many cases, use of the information may be subject to consent of an individual. As an example, an individual may consent via an opt-in or opt-out process. Moreover, storage of the information may utilize various encryption techniques to protect the security and integrity of the information.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a user device, an application for a transaction card,
      the application including an option that allows the user device to opt-in to one or more activation procedures;
   sending, by the device and to the user device, activation instructions indicating how to activate the transaction card based on the user device being opted in to the one or more activation procedures;
   receiving, by the device and from the user device, a multimedia file that is to be used to authenticate the transaction card,
      wherein the multimedia file is received as part of a procedure for activating the transaction card,
      the multimedia file including a video,
      wherein the multimedia file includes:
         a first set of data identifying a face of a user,
         a second set of data identifying a transaction card identifier, and
         a third set of data identifying an authorized action,
            the authorized action including at least one of:
               first instructions for the user to speak a word or phrase during the video, or
               second instructions for the user to make a particular movement or motion during the video, and
      wherein requirements associated with the first set of data, the second set of data, and the third set of data are set forth in the activation instructions;
   determining, by the device, whether to authenticate the transaction card by executing a plurality of authentication procedures that process the multimedia file,
      wherein the plurality of authentication procedures include a first authentication procedure that is executed to verify that the multimedia file includes the requirements associated with the first set of data, the second set of data, and the third set of data, and
      wherein the plurality of authentication procedures includes a second authentication procedure that includes:
         comparing the first set of data identifying the face of the user and historical object data identifying faces of users that have been used to authenticate other transaction cards,
         determining a number of times that the first set of data has been used to authenticate the other transaction cards based on comparing the first set of data and the historical object data, and determining whether the number of times that the first set of data has been used to authenticate other transaction cards satisfies a threshold value,
wherein the threshold value is an indicator of a fraudulent attempt to activate the transaction card;
determining, by the device, whether to activate the transaction card based on whether the number of times that the first set of data has been used to authenticate the other transaction cards satisfies the threshold value; and
providing, by the device and to the user device, a notification indicating whether the transaction card has been activated based on whether the transaction card has been activated.

2. The method of claim 1, wherein the first set of data is first image data, the second set of data is second image data, and the third set of data is audio data.

3. The method of claim 1, wherein executing the first authentication procedure comprises:
converting the multimedia file into a set of frames,
wherein converting the multimedia file causes the first set of data and the second set of data to be converted from a first data type to a second data type,
processing a frame, of the set of frames, to identify the first set of data identifying the face of the user and the second set of data identifying the transaction card identifier,
determining whether the first set of data that has been converted satisfies a first threshold level of similarity with a fourth set of data identifying generic properties of a human face,
determining whether the second set of data that has been converted satisfies a second threshold level of similarity with a fifth set of data identifying the transaction card identifier,
converting the third set of data identifying the authorized action from a third data type to the second data type,
determining whether the third set of data that has been converted satisfies a third threshold level of similarity with a sixth set of data identifying the authorized action; and
wherein determining whether to activate the transaction card comprises:
determining whether to activate the transaction card based on whether the first set of data satisfies the first threshold level of similarity with the fourth set of data, based on whether the second set of data satisfies the second threshold level of similarity with the fifth set of data, and based on whether the third set of data satisfies the third threshold level of similarity with the sixth set of data.

4. The method of claim 1, wherein receiving the multimedia file comprises:
receiving the multimedia file,
the multimedia file including a fourth set of data identifying a form of user identification;
wherein executing the first authentication procedure comprises:
determining whether the first set of data satisfies a first threshold level of similarity with a fifth set of data identifying generic properties of a human face,
determining whether the second set of data satisfies a second threshold level of similarity with a sixth set of data identifying the transaction card identifier,
determining whether the third set of data satisfies a third threshold level of similarity with a seventh set of data identifying the authorized action, and
determining whether the fourth set of data satisfies a fourth threshold level of similarity with an eighth set of data identifying the form of user identification; and
wherein determining whether to activate the transaction card comprises:
determining whether to activate the transaction card based on whether the first set of data satisfies the first threshold level of similarity with the fourth set of data, based on whether the second set of data satisfies the second threshold level of similarity with the fifth set of data, based on whether the third set of data satisfies the third threshold level of similarity with the sixth set of data, and based on whether the fourth set of data satisfies the fourth threshold level of similarity with the eighth set of data.

5. The method of claim 1, further comprising:
receiving, before executing the plurality of authentication procedures, location metadata identifying a first geographic location of the user device;
wherein determining whether to authenticate the transaction card by executing the plurality of authentication procedures comprises:
executing the second authentication procedure of the plurality of authentication procedures,
wherein the second authentication procedure includes:
comparing the location metadata and additional location metadata identifying a second geographic location of a particular device or the user device at a time when the particular device or the user device submitted the application for the transaction card,
determining whether the location metadata satisfies a distance threshold with the additional location metadata; and
wherein determining whether to activate the transaction card comprises:
determining whether to activate the transaction card based on whether the location metadata satisfies the distance threshold with the additional location metadata.

6. The method of claim 1, wherein determining whether to activate the transaction card comprises:
determining to activate the transaction card based on the number of times that the first set of data has been used to authenticate the other transaction cards satisfies the threshold value; and
wherein the method further comprises:
storing the first set of data identifying the face of the user for a threshold time period;
receiving, within the threshold time period, an indication that the transaction card is being used fraudulently; and
providing the first set of data to a device associated with a law enforcement agency.

7. The method of claim 1, wherein the transaction card comprises one or more of:
a credit card,
a debit card,
an electronic funds transfer card,
a point-of-sale card,
an electronic funds gift card,
a card associated with financial assets, or
a virtual card implemented on the user device.

8. A device, comprising:
one or more memories; and
one or more processors, communicatively coupled to the one or more memories, configured to:
receive, from a user device, an application for a transaction card,
the application including an option that allows the user device to opt-in to one or more activation procedures;
send, to the user device, activation instructions indicating how to activate the transaction card based on the user device being opted in to the one or more activation procedures;
receive, from the user device, a multimedia file that is to be used to authenticate the transaction card,
wherein the multimedia file is received as part of a procedure for activating the transaction card,
the multimedia file including a video,
wherein the multimedia file includes:
a first set of data identifying a face of a user,
a second set of data identifying a transaction card identifier, and
a third set of data identifying an authorized action, the authorized action including at least one of:
first instructions for the user to speak a word or phrase during the video, or
second instructions for the user to make a particular movement or motion during the video,
wherein the third set of data is a different data type than the first set of data and the second set of data, and
wherein requirements associated with the first set of data, the second set of data, and the third set of data are set forth in the activation instructions;
determine whether to authenticate the transaction card by executing a plurality of authentication procedures that process the multimedia file,
wherein the plurality of authentication procedures include a first authentication procedure that is executed to verify that the multimedia file includes the first set of data, the second set of data, and the third set of data, and
wherein the plurality of authentication procedures includes a second authentication procedure that includes:
comparing the first set of data identifying the face of the user and historical object data identifying faces of users that have been used to authenticate other transaction cards,
determining a number of times that the first set of data has been used to authenticate the other transaction cards based on comparing the first set of data and the historical object data, and
determining whether the number of times that the first set of data has been used to authenticate other transaction cards satisfies a threshold value,
wherein the threshold value is an indicator of a fraudulent attempt to activate the transaction card;
provide, to a server device, a request to activate the transaction card if the transaction card has been authenticated,
wherein the request causes the server device to activate the transaction card and to provide, to the device, an indication that the transaction card has been activated; and
provide, to the user device, a notification indicating whether the transaction card has been activated based on receiving the indication that the transaction card has been activated.

9. The device of claim 8, wherein the one or more processors, when executing the first authentication procedure, are configured to:
determine whether the multimedia file satisfies a set of preliminary requirements, the set of preliminary requirements including at least one of:
a first requirement that the multimedia file includes data of a particular data type,
a second requirement that the multimedia file is of a particular duration,
a third requirement that the multimedia file includes a particular object, or
a fourth requirement that the multimedia file includes audio of a human voice.

10. The device of claim 8, wherein the one or more processors, when receiving the multimedia file, are configured to:
receive the multimedia file,
the multimedia file including a fourth set of data identifying a form of user identification; and
wherein the one or more processors, when executing the first authentication procedure, are to:
determine whether the first set of data that has been converted satisfies a first threshold level of similarity with a fifth set of data identifying generic properties of a human face,
determine whether the second set of data that has been converted satisfies a second threshold level of similarity with a sixth set of data identifying the transaction card identifier,
determine whether the third set of data that has been converted satisfies a third threshold level of similarity with a seventh set of data identifying the authorized action
determine whether the fourth set of data satisfies a fourth threshold level of similarity with an eighth set of data identifying the form of user identification, and
determine whether to authenticate the transaction card based on whether the first set of data satisfies the first threshold level of similarity with the fourth set of data, based on whether the second set of data satisfies the second threshold level of similarity with the fifth set of data, based on whether the third set of data satisfies the third threshold level of similarity with the sixth set of data, and based on whether the fourth set of data satisfies the fourth threshold level of similarity with the eight set of data.

11. The device of claim 8, wherein the one or more processors, when determining whether to authenticate the transaction card by executing the first authentication procedure, are configured to:
process the multimedia file to determine whether one or more rules are satisfied,
wherein the one or more rules include at least one of:
a first rule indicating that the multimedia file includes a fourth set of data identifying at least a portion of a human arm, a second rule indicating that a distance between the user device and the face of the user satisfies a distance threshold, or
a third rule indicating that an angle between the user device and the face of the user satisfies an angle threshold, and
determine whether to authenticate the transaction card based on whether the one or more rules are satisfied.

12. The device of claim 8, wherein the one or more processors are further configured to:
receive, before executing the plurality of authentication procedures, location metadata identifying a geographic location of the user device at a time when the multimedia file was generated by the user device; and
wherein the one or more processors, when executing the plurality of authentication procedures, are configured to:
execute the second authentication procedure of the plurality of authentication procedures,
wherein the one or more processors, when executing the second authentication procedure, are configured to:
compare the location metadata and additional location metadata identifying a geographic region of a location in which a particular device or the user device submitted the application for the transaction card,
determine whether the geographic location identified by the location metadata is within the geographic region identified by the additional location metadata, and
determine whether to authenticate the transaction card based on whether the geographic location identified by the location metadata is within the geographic region identified by the additional location metadata.

13. The device of claim 8, wherein the one or more processors, when determining whether to authenticate the transaction card, are configured to:
authenticate the transaction card; and
wherein the one or more processors are further configured to:
store the first set of data identifying the face of the user;
receive an indication that the transaction card is being used fraudulently; and
provide the first set of data to a device associated with a law enforcement agency.

14. The device of claim 8, wherein the transaction card comprises one or more of:
a credit card,
a debit card,
an electronic funds transfer card,
a point-of-sale card,
an electronic funds gift card,
a card associated with financial assets, or
a virtual card implemented on the user device.

15. A non-transitory computer-readable medium storing instructions, the instructions comprising:
one or more instructions that, when executed by one or more processors, cause the one or more processors to:
receive, from a user device, an application for a transaction card,
the application including an option that allows the user device to opt-in to one or more activation procedures;
send, to the user device, activation instructions indicating how to activate the transaction card based on the user device being opted in to the one or more activation procedures;
receive, from the user device, a multimedia file that is to be used to authenticate the transaction card,
wherein the multimedia file is received as part of a procedure for activating the transaction card,
the multimedia file including a video,
wherein the multimedia file includes one or more sets of data, including:
a first set of data identifying a face of a user,
a second set of data identifying a transaction card identifier, and
a third set of data identifying an authorized action, the authorized action including at least one of:
first instructions for the user to speak a word or phrase during the video, or
second instructions for the user to make a particular movement or motion during the video, and
wherein requirements associated with the first set of data, the second set of data, and the third set of data are set forth in the activation instructions;
determine whether to authenticate the transaction card by executing a plurality of authentication procedures that process the multimedia file,
wherein the plurality of authentication procedures includes a first authentication procedure that is executed to verify that the multimedia file includes the first set of data, the second set of data, and the third set of data, and
wherein the plurality of authentication procedures includes one or more additional authentication procedures that are executed to determine whether an unauthorized user is attempting to activate the transaction card,
wherein the one or more additional authentication procedures comprises:
comparing the first set of data identifying the face of the user and historical object data identifying faces of users that have been used to authenticate other transaction cards,
determining a number of times that the first set of data has been used to authenticate the other transaction cards based on comparing the first set of data and the historical object data, and
determining whether the number of times that the first set of data has been used to authenticate other transaction cards satisfies a threshold value,
wherein the threshold value is an indicator of a fraudulent attempt to activate the transaction card;
determine whether to activate the transaction card based on whether the number of times that the first set of data has been used to authenticate the other transaction cards satisfies the threshold value; and
provide, to the user device, a notification indicating whether the transaction card has been activated based on whether the transaction card has been activated.

16. The non-transitory computer-readable medium of claim 15, wherein the first set of data is first image data, the second set of data is second image data, and the third set of data is audio data.

17. The non-transitory computer-readable medium of claim 15, wherein the one or more instructions, that cause the one or more processors to determine whether to authenticate the transaction card by executing the first authentication procedure, cause the one or more processors to:
identify a set of preliminary requirements that are to be satisfied before authorizing contents of the multimedia file,
determine whether a duration of the multimedia file is of a particular duration based on a first preliminary requirement indicating that the multimedia file is to be of the particular duration,
determine whether the multimedia file includes data of a particular data type based on a second preliminary requirement indicating that the multimedia is to include the data of the particular data type, and
determine whether the multimedia file includes a particular object based on a third preliminary requirement indicating that the multimedia file is to include the particular object.

18. The non-transitory computer-readable medium of claim 15, wherein the one or more instructions, that cause the one or more processors to receive the multimedia file, cause the one or more processors to:
receive the multimedia file,
the multimedia file including a fourth set of data identifying at least a portion of a human arm;
wherein the one or more instructions, that cause the one or more processors to determine whether to authenticate the transaction card by executing the first authentication procedure, cause the one or more processors to:
process the multimedia file to determine whether one or more rules are satisfied, wherein the one or more rules include at least one of:
a first rule indicating that the multimedia file includes a fifth set of data identifying at least a portion of the human arm,
a second rule indicating that a distance between the user device and the face of the user satisfies a distance threshold, or
a third rule indicating that an angle between the user device and the face of the user satisfies an angle threshold; and
wherein the one or more instructions, that cause the one or more processors to determine whether to activate the transaction card, cause the one or more processors to:
determine whether to activate the transaction card based on whether the one or more rules are satisfied.

19. The non-transitory computer-readable medium of claim 15, wherein the one or more instructions, when executed by the one or more processors, further cause the one or more processors to:
receive, before executing the plurality of authentication procedures, location metadata identifying a first geographic location of the user device;
wherein the one or more instructions, that cause the one or more processors to determine whether to authenticate the transaction card by executing the one or more additional authentication procedures, cause the one or more processors to:
execute a particular authentication procedure of the one or more additional authentication procedures,
wherein the one or more instructions, that cause the one or more processors to execute the particular authentication procedure, cause the one or more processors to:
compare the location metadata and additional location metadata identifying a second geographic location of a particular device or the user device at a time when the particular device or the user device submitted the application for the transaction card,
determine whether the location metadata satisfies a distance threshold with the additional location metadata; and
wherein the one or more instructions, that cause the one or more processors to determine whether to activate the transaction card, cause the one or more processors to:
determine whether to activate the transaction card based on whether the location metadata satisfies the distance threshold with the additional location metadata.

20. The non-transitory computer-readable medium of claim 15, wherein the transaction card comprises one or more of:
a credit card,
a debit card,
an electronic funds transfer card,
a point-of-sale card,
an electronic funds gift card,
a card associated with financial assets, or
a virtual card implemented on the user device.

* * * * *